United States Patent [19]

Bagwell et al.

[11] Patent Number: 5,101,997
[45] Date of Patent: Apr. 7, 1992

[54] CONTAINER FOR RECYCLABLE MATERIALS

[76] Inventors: William P. Bagwell; Marlin L. Bagwell, both of P.O. 265, Dalton Cemetary Rd., Marietta, Tex. 75566

[21] Appl. No.: 595,208

[22] Filed: Oct. 10, 1990

[51] Int. Cl.⁵ ............................................. B65D 91/00
[52] U.S. Cl. ............................ 220/23.4; 220/23.83; 220/909
[58] Field of Search ................. 220/23.4, 23.83, 909

[56] References Cited

U.S. PATENT DOCUMENTS

| | | |
|---|---|---|
| 617,445 | 1/1899 | Nathan . |
| 1,978,695 | 1/1933 | Clark .................... 211/77 |
| 2,030,899 | 2/1936 | Scurlock ................ 211/77 |
| 2,091,394 | 8/1937 | Park ..................... 211/77 |
| 2,285,801 | 6/1942 | Burnet ............... 220/23.4 X |
| 2,312,256 | 10/1940 | Lumley ................. 224/45 |
| 2,470,432 | 1/1946 | Cusick ................. 220/23.4 |
| 2,565,448 | 5/1951 | Brownell .............. 224/45 |
| 2,702,641 | 2/1955 | Arthur ............. 220/23.4 X |
| 3,648,875 | 3/1972 | Lundgren .............. 220/1 |
| 3,747,754 | 7/1973 | Nix et al. ............ 209/80.5 |
| 3,904,218 | 9/1975 | Kostic .............. 220/909 X |
| 3,913,778 | 10/1975 | Oglesbee ........... 220/23.83 |
| 3,952,906 | 4/1976 | Georgopulos ......... 220/18 |
| 4,801,034 | 1/1989 | Sandomeno ....... 220/909 X |
| 4,834,253 | 5/1989 | Crine ............ 220/23.83 X |
| 4,860,909 | 8/1989 | Leumi ................. 220/1 T |
| 4,867,328 | 9/1989 | McCarthy ......... 220/909 X |
| 4,878,592 | 11/1989 | Lee .................. 220/23.83 |
| 4,905,853 | 3/1990 | Strawder ......... 220/909 X |
| 4,984,704 | 1/1991 | O'Malley ......... 220/909 X |

FOREIGN PATENT DOCUMENTS

| | | |
|---|---|---|
| 392309 | 11/1924 | Fed. Rep. of Germany . |
| 255698 | 10/1927 | Italy . |
| 11427 | 5/1905 | United Kingdom . |

*Primary Examiner*—Steven M. Pollard
*Attorney, Agent, or Firm*—Gregory W. Carr

[57] ABSTRACT

The invention is a receptacle for separately holding and dispensing waste articles of different materials, such as aluminum, glass, plastic, paper, and the like. The receptacle includes a number of bins, each for containing articles constructed of a specified material. The bins are separately removable from the receptacle, for deposit of the contained articles at a recycling repository or station.

10 Claims, 1 Drawing Sheet

CONTAINER FOR RECYCLABLE MATERIALS

TECHNICAL FIELD

This invention relates to containing recyclable goods and, more particularly, to a container for separating, holding and dispensing waste articles of different materials, such as aluminum, glass, paper and the like.

BACKGROUND AND SUMMARY

In the recent past, interest in recycling of household waste materials has increased steadily. The types of materials most often recycled include paper, glass, aluminum and plastic. Recycling aids conservation by reusing previously manufactured goods to supply materials needed for the manufacture of new goods, thus avoiding the unnecessary expenditure of limited natural resources and the cost of locating and processing such resources. Recycling also protects the environment by minimizing the amount of waste disposed of through land fills, incineration and other similar means.

Articles that are recycled must be grouped according to the type of material from which each is constructed. This step is required to allow processing of articles manufactured from a similar material, utilizing a common, efficient process. Also, the presence of dissimilar materials in the recycling process essentially contaminates the recycled material. As a result, dissimilar material is usually discarded as waste prior to or during the recycling process.

Businesses and communities involved in recycling household waste now frequently require separation of recyclable articles into common groups, such as glass, paper, aluminum, and the like, before being accepted. As an example, some communities provide separate receptacles for receiving articles manufactured from each type of material, such as one receptacle for glass, one for aluminum, and so on.

An impediment to the recycling process is the commonly used household trash receptacle. Such receptacles generally provide only a single container into which all glass, paper, aluminum and waste of other materials is collected. The result is undesirable mixing of various types of materials, requiring the offensive, and time-consuming task of sorting such waste prior to delivery for recycling. Accordingly, there is a need for a waste receptacle capable of maintaining separation between discarded articles of various types, while allowing separate removal of each type of material for recycling.

The present invention provides a solution to the aforementioned shortcomings of available receptacles. The invention is a receptacle having two or more removable bins supported on a base. Each bin can be used to hold discarded articles of a certain material, for example, one for glass, and one for paper. The base of the receptacle is supported on casters, a bearing assembly and/or other mechanisms allowing rotation of the receptacle to position the bins for easy access by the user. Articles are thus sorted as they are discarded, by placement of each article in the appropriate bin, based on the type of material from which the articles are constructed.

It will be appreciated that such a receptacle may include three, four, or as many bins as is desireable, depending upon the variety of materials sought to be recycled.

BRIEF DESCRIPTION OF THE DRAWINGS

A more complete understanding of the invention may be had by reference to the following Detailed Description when taken in conjunction with the accompanying Drawings in which.

DETAILED DESCRIPTION

Figures 1, 3:
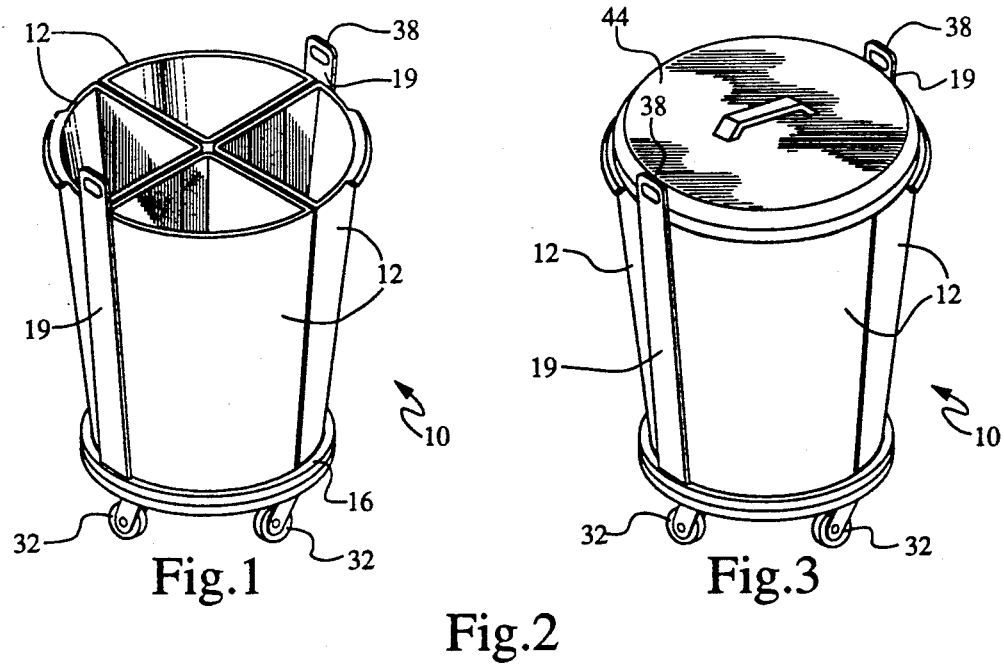
FIG. 1 is a perspective view illustrating a receptacle embodying the invention.
FIG. 3 is a perspective view of the receptacle shown in FIGS. 1 and 2, having a cover for use outside the home.
Figure 2:
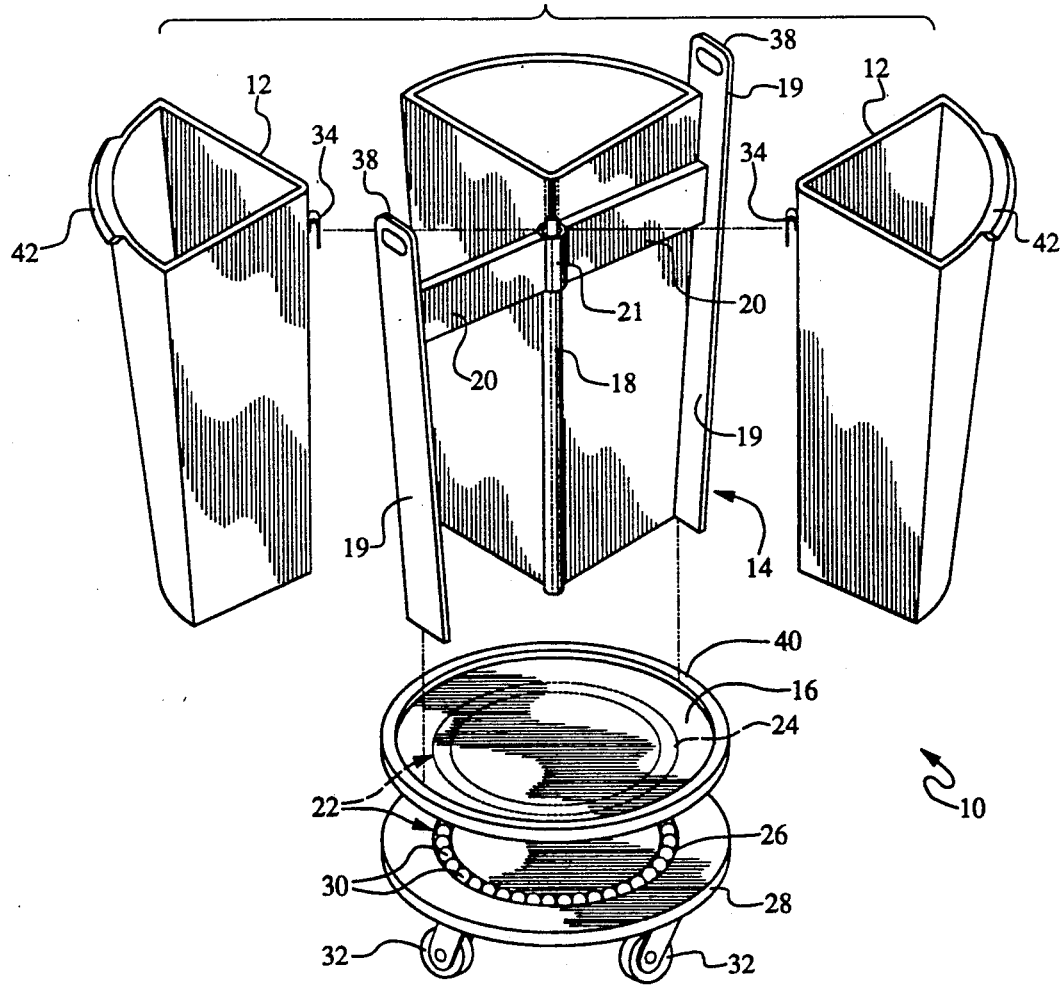
FIG. 2 is an exploded perspective view illustrating the construction and assembly of components of the receptacle shown in FIG. 1.

A receptacle 10 incorporating the present invention is shown in FIGS. 1, 2 and 3. The receptacle 10 includes four separate containers, or bins 12. In practice, each of these bins 12 is intended to contain articles manufactured from similar materials. For example, one of the bins 12 may be designated for holding only aluminum articles, another of the bins 12 designated for glass, and so on. Although the receptacle 10 is shown with four bins 12, it will be appreciated that the receptacle 10 could be constructed with two, three, five, six or as many bins 12 as desirable for the particular application.

The receptacle 10 includes a base 16 supporting a frame 14, comprising a vertical support member 18 secured to and extending upwardly from the base 16, two cross-members 20 secured to and extending outwardly from the support member 18, and a pair of support strips 19 secured to both the support members 18 and the base 16. The support member 18 is shown as a tube having a cup 21 secured to its upper end; however, other substantially rigid structures may be used. The base 16 forms a floor supporting the bins 12. The cross-members 20 reinforce the support strips 19 and the support member 18.

The base 16, support member 18, cross-members 20 and support strips 19 are preferably constructed by injection molding of plastic, as a single unit. However, it will be apparent that other suitable means of securing such components together can be utilized, such as gluing, welding, and/or snap-fitting. Further, it will be apparent that such components may be constructed from other suitable materials in addition to plastic, if desired.

The receptacle 10 is supported for rotation about an axis aligned with the support member 18, by a bearing assembly 22 mounted on the bottom surface of the base 16. The bearing assembly 22 includes a circular bearing race 24 (shown by broken lines) formed in the bottom surface of the base 16. The race 24 overlies a corresponding race 26 formed in a stand 28. The base 16 and stand 28 are secured together for rotation relative to each other, at a point substantially at their center, by conventional means (not shown). Both the base 16 and stand 28 are preferably formed from injection-molded plastic; however, other suitable materials can be used. Bearings 30, comprising marbles or other ball-bearings, are interposed between and roll along the races 24 and 26, supporting the base 16 and allowing rotation of the receptacle 10 on the stand 28.

Positioning of the receptacle 10 is facilitated by three casters 32 pivotally mounted to and extending downwardly from the stand 28. The casters 32 allow lateral movement of the entire receptacle 10 in virtually any direction. Thus, the combination of the bearing assembly 22 and the casters 32 allows positioning of the receptacle 10 in any accessible location and orientation of the bins 12 as desired.

The receptacle 10 includes a number of features which hold each of the bins 12 within the receptacle 10, while also facilitating removal of each of the bins 12 for cleaning and emptying their contents. Specifically, each bin 12 includes a hook 34. The hooks 34 are mounted to each bin 12 below its upper end. The hooks 34 insert into the cup 21 secured to the upper end of the tubular support member 18, as the bins 12 are lowered onto the base 16. The hooks 34 hold the bins 12 upright within the receptacle 10. The support strips 19 each include a handle 38 formed near their upper ends, to facilitate handling the receptacle 10. The support strips 19 hold the adjacent corner of each neighboring bin 12 within the receptacle 10, aiding in the prevention of bins 12 inadvertently tipping out of the receptacle 10. A rim 40 formed about the perimeter of the base 16 prevents the lower end of each bin 12 from inadvertently sliding off the base 16. A lip 42 extending from the upper perimeter of each bin 12 is provided to facilitate both carrying and removing the bins 12 from the receptacle 10.

The receptacle 10 can be manufactured in a variety of sizes, depending upon the capacity desired and the desired application. For example, the receptacle 10 can be sized to fit beneath a kitchen sink, or sized somewhat larger for placement elsewhere within a home. Further, the receptacle 10 can be constructed in a size similar to a standard garbage can for use outside the home. In the latter instance, a cover 44, such as that shown in FIG. 3, is provided to cover the contents of the receptacle 10. As is shown in FIG. 3, the handles 38 are positioned by the upper ends of the support strips 19 to which they are attached, above the cover, allowing the receptacle 10 to be handled without removing the cover 44.

The bins 12 of the receptacle 10 need not be of identical sizes. FIGS. 1 and 2 show the bins 12 each comprising approximately one-quarter of the contents of the receptacle 10. However, the bins 12 may be sized differently from each other, if desired, to accommodate differing quantities of the various types materials discarded by a household. If, for example, a household discards substantially more paper articles than glass, then a larger bin 12 would be provided and used to collect paper waste, while a smaller bin 12 would be provided and used to collect discarded glass articles. The capacity of each of the bins 12 can be varied in relation to remaining bins 12 by increasing or decreasing the arc angle of the circular receptacle 10 occupied by the bin 12. For example, instead of each bin 12 occupying a 90° arc, as is shown in FIGS. 1 and 2, one bin 12 might occupy a 120° arc, while the remaining three bins 12 occupy an 80° arc. A corresponding variance in the capacity or volume of each of the bins 12 would result In use, the bins 12 are inserted into the receptacle 10, as shown in FIG. 1. If positioned below a sink, for example, the receptacle 10 is rotated on the bearing assembly 22 until the desired bin 12 (e.g. for glass) is closest to the user. The waste article is then easily deposited in the bin 12 selected. Once any of the bins 12 is filled to a desired level, the bin 12 is lifted out of its compartment 14, by grasping its lip 42. By so doing, the hook 34 of the bin 12 disengages the cup 21. Once emptied, the bin 12 is easily reinserted downwardly into the receptacle 10, with the lower end within the rim 40 of the base 16 and with its hook 34 engaging the cup 21 on the upper end of the support member 18.

The receptacle 10 preferably has a round exterior. This allows rotation of the receptacle 10 without obstruction in confined areas, such as when placed in a corner or under a sink. Thus, the outwardly facing surfaces of the bins 12 preferably have a substantially uniform radius of curvature.

Only the preferred embodiments of the invention have been described. It should be understood that the invention is not limited to the embodiments disclosed, but is intended to embrace any alternative, modifications, rearrangements, or substitutions of parts or elements as fall within the spirit and scope of the invention.

I claim:

1. A trash receptacle comprising:
   a first container for holding waste articles;
   a second container for holding waste articles separate from the articles held by the first container;
   a support means for supporting the first and second containers in an upright position to allow receipt of trash, wherein the support means includes a base and a central support member extending upwardly from the base between the first and second containers;
   fastening means on said containers for securing at least the upper ends of the first and second containers to the support means in an upright position;
   fastening means on said central support member including at least one fastener member on said central support member for engaging the fastening means on said containers as each container is lowered into place in the receptacle.

2. A trash receptacle of claim 1 further comprising positioning means for allowing selective rotation of the receptacle to position the containers for easy access and removal.

3. The trash receptacle of claim 1 wherein the fastening means further includes at least two support members, each mounted to and extending laterally from the support member between the containers and secured to the base, for reinforcing the support member and assisting in the support of the containers.

4. The trash receptacle of claim 1 further comprising at least third and fourth containers for holding waste articles and wherein the fastening means releasably secures the first and second containers to the support member.

5. The trash receptacle of claim 1 wherein the fastening means includes a hook secured to each container and a cup secured to the support member for receiving the hooks as their respective containers are placed in the receptacle.

6. The trash receptacle of claim 1 wherein the fastening means is for securing the lower end of each container on the support means.

7. The trash receptacle of claim 6 wherein the fastening means includes a lip extending upwardly from the support means for retaining the lower ends of the containers on the support means.

8. A trash receptacle comprising:
   a movable base member;
   a substantially circular base rotatably mounted on the movable base;
   a plurality of trash receptacles for separately receiving and storing trash, wherein each container includes two vertical walls attached to a vertical wall having a curvilinear surface, and the vertical walls are secured to a horizontal base;

a vertical support member having first and second ends wherein the first end is secured to the center of the base;

one or more lateral support members having first and second ends, wherein the first end is secured to the perimeter of the base;

one or more cross support members each having first and second ends, wherein the first end is secured to one of the vertical support members, and wherein the second end is secured to a lateral support member;

a hook-like projection secured to the upper end of each trash receptacle for detachably mounting the trash receptacles on the base; and means for receiving and detachably mounting the hook-like projection on the vertical support member.

9. Apparatus for detachably mounting trash receptacles comprising:

a base;

a vertical support member having first and second ends wherein the first end is secured to the center of the base;

one or more lateral support members having first and second ends, wherein the first end is secured to the perimeter of the base;

one or more cross support members each having first and second ends, wherein the first end is secured to one of the lateral support members, and wherein the second end is secured to the vertical support member; and fastening means mounted to each trash receptacle for detachably securing the trash receptacles on the base.

10. Apparatus for detachably mounting pie-shaped trash receptacles on a movable base comprising:

a substantially circular rotatable base;

a vertical support member having first and second ends, wherein the first end is secured to the base;

one or more opposed pairs of lateral support strips having first and second ends, wherein the first end of each support strip is secured to the perimeter of the circular base;

one or more cross-members each having first and second ends, wherein the first end of each cross-member is secured to and extends outwardly from the vertical support member, and wherein the second end of each cross-member is secured to one of the lateral support strips;

a cup supported by the vertical support member; and a hook mounted at the apex of each of the pie-shaped receptacles for insertion into the cup to thereby detachably secure the pie-shaped trash receptacles on the movable base.

* * * * *